US005690493A

United States Patent [19]

McAlear, Jr.

[11] Patent Number: 5,690,493

[45] Date of Patent: Nov. 25, 1997

[54] THOUGHT FORM METHOD OF READING FOR THE READING IMPAIRED

[76] Inventor: Anthony M. McAlear, Jr., 87 Old Forge Rd., Scituate, Mass. 02066

[21] Appl. No.: 745,701

[22] Filed: Nov. 12, 1996

[51] Int. Cl.[6] .................... G09B 17/00

[52] U.S. Cl. .................... 434/178; 434/184

[58] Field of Search .................... 434/178, 167, 434/176, 179, 184

[56] References Cited

U.S. PATENT DOCUMENTS

| | | | |
|---|---|---|---|
| 146,631 | 1/1874 | Allen | 434/178 |
| 1,582,810 | 4/1926 | Whitehead | 434/178 |
| 4,007,548 | 2/1977 | Cytanovich | 434/178 |
| 4,078,319 | 3/1978 | Mazrski et al. | 434/178 |
| 4,490,118 | 12/1984 | Stewart | 434/178 |
| 4,609,357 | 9/1986 | Clegg | 434/178 |
| 4,655,713 | 4/1987 | Weiss | 434/178 |
| 5,256,067 | 10/1993 | Gilden et al. | 434/178 |
| 5,336,093 | 8/1994 | Cox | 434/178 |
| 5,556,282 | 9/1996 | Middlebrook | 434/178 |

*Primary Examiner*—Paul J. Hirsch

*Attorney, Agent, or Firm*—John P. McGonagle

[57] ABSTRACT

A method for instructing the reading impaired by coding into thought forms words without pictures. Each word without a picture is coded onto a sheet. Each coding sheet has a word printed in large letters in a shadowed lower case and in a standard type face. The sheet also contains a definition of the word, several sample sentences with the word in it, and a picture scene enacting one of the sentences or suggesting an application of the word. The sheet is used as a tool enabling a student to convert the word into a retrievable thought form.

6 Claims, 12 Drawing Sheets

THE WORDS WITHOUT PICTURES

| Word | Frequency | Word | Frequency |
|---|---|---|---|
| a | High | before | Medium |
| about | Medium | between | Medium Low |
| again | Medium Low | but | High |
| ago | Medium | by | High |
| all | Medium High | can | Medium High |
| almost | Medium Low | could | Medium |
| also | Medium High | can't | Medium Low |
| always | Medium High | cannot | Low |
| an | Medium High | come | Medium |
| and | High | came | Medium Low |
| another | Medium | comes | Low |
| any | Medium Low | coming | Low |
| anyhow | Medium High | do | Medium High |
| anyway | Low | did | Medium |
| as | High | does | Low |
| at | High | doing | Medium Low |
| away | Medium High | done | Medium |
| back | Medium High | don't | Medium Low |
| be | High | doesn't | Medium |
| am | High | down | Medium High |
| are | High | each | Medium High |
| is | High | either | Medium Low |
| was | High | else | Low |
| were | High | even | Medium |
| being | Medium | ever | Medium Low |
| been | Medium Low | every | Medium |
| because | Medium High | everything | Low |
| become | Medium | for | High |
| became | Low | from | Medium High |
| becoming | Low | front | Low |
| becomes | Medium Low | full | Medium Low |

FIG. 1A

THE WORDS WITHOUT PICTURES

| Word | Frequency | Word | Frequency |
|---|---|---|---|
| get | Medium High | last | Medium Low |
| gets | Low | leave | Medium |
| getting | Medium | leaves | Low |
| got | Medium Low | leaving | Medium Low |
| go | High | left | Low |
| goes | Medium | least | Low |
| going | Medium Low | less | Medium |
| gone | Low | let | Low |
| went | Low | lets | Low |
| have | High | let's | Low |
| had | High | letting | Low |
| has | High | like | High |
| having | Low | liked | Low |
| he | High | likes | Low |
| he's | Medium | liking | Low |
| her | Medium Low | make | Medium High |
| hers | Low | made | Medium High |
| here | Medium | makes | Medium Low |
| him | Medium High | making | Medium |
| his | High | many | Medium High |
| how | Medium High | may | Medium |
| I | High | maybe | Low |
| if | Medium High | me | Medium High |
| in | High | mine | Medium Low |
| into | Medium High | more | High |
| isn't | Medium High | most | Low |
| it | High | much | Medium |
| its | Medium Low | my | High |
| it's | Medium High | neither | Medium Low |
| just | Medium | never | Medium High |

FIG. 1B

THE WORDS WITHOUT PICTURES

| Word | Frequency | Word | Frequency |
|---|---|---|---|
| no | Medium | she's | Medium High |
| none | Low | shall | Low |
| nor | Medium Low | should | Medium |
| not | Medium High | so | High |
| now | Medium | some | Medium High |
| of | High | soon | Low |
| off | Medium Low | stand | Medium Low |
| on | High | standing | Low |
| one | Medium High | stands | Low |
| onto | Low | stood | Low |
| or | High | such | Low |
| other | Medium | sure | Medium |
| others | Low | take | Medium Low |
| otherwise | Low | takes | Medium |
| our | Medium High | taking | Low |
| ours | Low | took | Medium Low |
| out | Medium High | than | Medium |
| over | Medium High | that | High |
| put | Low | that's | Medium Low |
| puts | Low | the | High |
| putting | Low | their | Medium High |
| run | Low | theirs | Low |
| ran | Low | them | Medium High |
| running | Low | then | Medium |
| runs | Low | there | Medium High |
| same | Medium | there's | Low |
| see | Medium High | these | Medium High |
| saw | Medium Low | they | High |
| seen | Medium | they're | Medium Low |
| sees | Medium Low | this | High |
| she | Medium High | those | Medium High |

FIG. 1C

THE WORDS WITHOUT PICTURES

| Word | Frequency |
|---|---|
| through | Medium |
| to | High |
| too | Medium Low |
| unless | Medium |
| until | Medium Low |
| up | Medium High |
| upon | Low |
| us | Medium |
| very | Medium Low |
| we | High |
| we're | Low |
| what | Medium |
| when | Medium High |
| where | Medium Low |
| where's | Low |
| whether | Low |
| which | High |
| while | Low |
| who | High |
| who's | Low |
| whose | Low |
| why | High |
| will | Medium High |
| with | High |
| within | Low |
| without | Medium |
| won't | Low |
| would | Medium High |
| yet | Low |
| you | High |

| Word | Frequency |
|---|---|
| your | Medium Low |
| you're | Medium |
| yours | Low |
| only | Low |
| under | Medium Low |
| began | Medium |

FIG. 1D

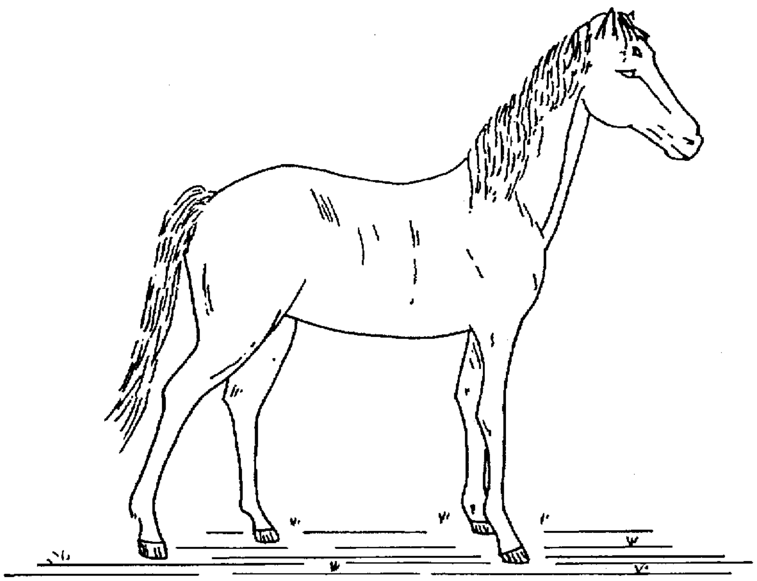

BLASE: REBEL HORSE

All the ranchers in the valley knew about the wild stallion named Blase, a powerful horse with a red mane. Many of the local men tried to catch this rebel but failed each time. A reward was offered for his capture--dead or alive, because he encouraged other horses to run away with him.

Pete Cook and six other men were determined to catch Blase. Pete used binoculars to study the wild horse's movements. He made several maps of the valley and was sure he could capture Blase this time.

Pete posted the men all along the secluded trails that Blase usually followed. Each rider would pick up Blase along the trail and force him into a narrow canyon, where Pete would be waiting.

The men succeeded in forcing Blase into the narrow canyon. Pete was ready with his rope but Blase came at him in a wild rage. Pete lost his balance but was able to roll over out of the way. Blase saw his chance to escape and got away once again.

FIG. 2

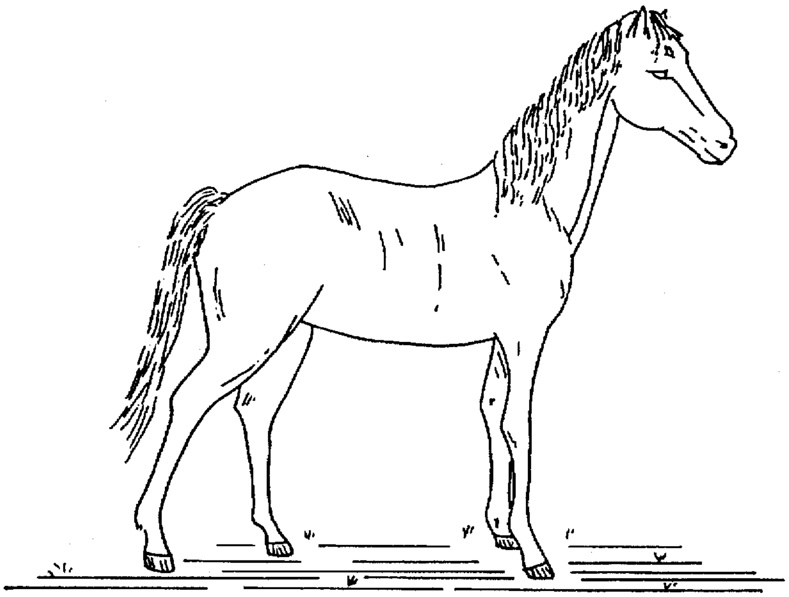

BLASE: REBEL HORSE

[redacted] ranchers [redacted] valley knew [redacted] wild stallion named Blase, [redacted] powerful horse [redacted] red mane. [redacted] local men tried [redacted] catch [redacted] rebel [redacted] failed [redacted] time. [redacted] reward [redacted] offered [redacted] capture--dead [redacted] alive, [redacted] encouraged [redacted] horses [redacted] run [redacted]

Pete Cook [redacted] six [redacted] men [redacted] determined [redacted] catch Blase. Pete used binoculars [redacted] study [redacted] wild horse's movements. [redacted] several maps [redacted] valley [redacted] capture Blase [redacted] time.

Pete posted [redacted] men [redacted] along [redacted] secluded trails [redacted] Blase usually followed. [redacted] rider [redacted] pick [redacted] Blase along [redacted] trail [redacted] force [redacted] narrow canyon, [redacted] Pete [redacted] waiting.

The men succeeded [redacted] forcing Blase [redacted] narrow canyon. Pete [redacted] ready [redacted] rope [redacted] Blase [redacted] wild rage. Pete lost his balance [redacted] able [redacted] roll [redacted] way. Blase [redacted] chance [redacted] escape [redacted] once [redacted]

FIG. 3 make *(definition)* make

Make means to cause something to happen. The children helped Dad make a house for to dog to sleep in. ✪ *See the picture*. Funny stories always make him laugh.

the the

The tells which one. Joan does not want any dog. She wants to keep the dog that followed her home from school.

Please close the door. The sun is bright.

the

The old brown bear is in my room.

they they

They means more than one. Sarah and Penny ran on the beach. Then they ran into the water.

Susan and Jack were late for school because they missed the bus.

they

They hold Freddie.

THOUGHT FORM METHOD OF READING FOR THE READING IMPAIRED

BACKGROUND OF THE INVENTION

This invention relates to a reading instruction method for the reading impaired, and more specifically, to a method of reading instruction which incorporates sensing anchors and triggers when a word is spoken, printed or written.

A reading impaired person is a person having a severe reading disability based on neuropsychological immaturity or dysfunction which interferes with the integration of perceptual and linguistic symbols. Reading impaired persons are often designated as having dyslexia, although a person's reading disability may have other neuropsychological causes. One problem that many reading impaired persons commonly experience is the inability to decode unfamiliar words. The abstract nature of alphabetic systems imposes large demands on individuals learning to read. In comparison to other languages, where pictures or written symbols correspond to specific ideas or concepts, alphabetic systems have letters, or graphemes, which have no meaning themselves. Instead, the letters represent speech sounds, or phonemes, which possess meaning only when blended together.

Humans think in pictures. The human mind records information in a gestalt, i.e., thought form, anchored by sight, sound, touch, taste and smell, i.e., the five senses. These anchors are used to file the information (as a thought form) and act as triggers to retrieve it. The thought forms can be retrieved and used by triggering any one or all of the sense anchors. With the advent of words, first spoken and then written, the mind adapted and overlaid the sensory anchors and triggers with an over all word anchor/trigger. The word anchor triggers the sense anchors triggering the thought form. This puts all the information stored in the memory about that word (idea) at the disposal of the person.

Reading impaired persons can generally retrieve a thought form with a spoken word using a sound trigger. However, a reading impaired person can generally not retrieve the thought form with a written or printed word without a visual trigger. Persons without a reading disability seem to be able to interchange the triggers.

The reading process, therefore, for the reading impaired is a difficult task since it involves the processing and integration of both visual and auditory information or stimuli. Many reading impaired persons are able to recall, by name, the majority of letters in the alphabet, but become confused when sounds are assigned to these letters. In the English alphabet, an individual letter is not assigned to consistently represent one distinct sound. The letter "a", for example, can represent a variety of sounds (i.e., "cat", "cake", "call", "card"). Due to these inherent inconsistencies in the spelling and pronunciation of the English language, most reading impaired persons disregard the auditory processing component, and tend to rely solely upon the visual stimuli for input. In effect, they learn to visually memorize as many words as possible.

This leads to another problem for the reading impaired. There is a core of approximately 220 words without pictures in the English language. These are small words that place things in time, space and relationships. They represent roughly 50% of the words used in normal communication and 120 of these words represent 40% of the words used. When a reading impaired person comes across one of these words, he or she draws an information blank. This puts the reading impaired person in the position of trying to understand what was read with half of the information.

Several methods have been devised to help impaired readers learn unfamiliar words. U.S. Pat. No. 5,336,093 describes a technique for instructing and aiding impaired readers by dividing multi-syllabic words in a passage into their single syllable components and placing a dot above the vowel, vowel diphthong, or vowel digraph which contributes to the distinctive sound of that syllable. U.S. Pat. No. 146,631 describes a technique for indicating the syllables of a word by placing a mark under or over the final letter of each syllable. More complicated syllable pattern recognition methods are described in U.S. Pat. Nos. 4,655,713 and 4,490,118. However, none of these techniques and methods address the problem of the core of words without pictures in the English language, most of which are single syllable words. These words place things in time, space and relationships, without which a sentence and paragraph cannot make sense.

SUMMARY OF THE INVENTION

The present invention is a method of reading instruction whereby the words without pictures, as well as other words which a particular reading impaired person finds especially difficult to read and understand, are coded into thought forms. The coding method results in the establishment of a mental picture for each such word.

This together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIGS. 1A–1D list a core of words without pictures along with their approximate frequency of use;

FIG. 2 illustrates a printed text which the reading impaired physically sees;

FIG. 3 illustrates the printed text of FIG. 2 with only the text that the reading impaired's mind sees;

DETAILED DESCRIPTION OF THE INVENTION

For the method of the present invention, a student is initially screened 1 to determine reading impairment and given a standard reading test 2 to establish a reading skills benchmark. The screening 1 and reading test 2 will determine the following.

1. Is the potential student able to read one or more paragraphs of every day English, silently, one time, at a reasonable speed, with a comprehension of between 90 to 100%. The average person is able to read at a rate of 200 to 300 words per minute with a comprehension rate of 90 to 100%. A typical reading impaired person will read at a rate of approximately 100 words per minute with a comprehension rate of 70 to 75%.

2. Is the potential student able to write without leaving out words and/or endings. Omitting words and/or endings are characteristics of a reading impaired person.

3. Is the potential student able to copy a paragraph without leaving out words and/or endings. Again, omitting words and/or endings is a characteristic of a reading impaired person.

4. Is the potential student able to add columns of numbers of a reasonable length with an adding machine or calculator (once) and get the right answer nine out of ten times. The reading impaired person usually cannot accomplish this.

5. Is the potential student able to use punctuation when writing or recognize its use in structuring ideas and thoughts in reading. The reading impaired person usually cannot accomplish this.

The inability to accomplish one or more of the above standards indicate a problem. Because of devastating social, physiological, and financial implications, the reading problem has the biggest impact.

A major problem for the reading impaired is the person's inability to see with his or her mind the words without pictures. FIGS. 1A–1C list a core sampling of words without pictures common to the English language with their approximate frequency of use. FIG. 2 illustrates a printed text from the Silvaroli Class Room Reading Inventory (a standard reading test) which the reading impaired physically sees with his or her eyes. FIG. 3 illustrates the same text as the reading impaired's mind sees it. Out of 184 words in the text, 84 words are words without pictures, i.e., 48% of the text.

The problem addressed by the method of the present invention is allowing the reading impaired's mind to "see" the full text illustrated in FIG. 2. The present invention method does this by "coding" the core words listed in FIGS. 1A–1C. The entire process takes approximately ten one-hour sessions, with the first session devoted entirely to the screening process. Once screened, the student begins the coding phase, usually sessions two through nine. During the first sessions fifteen to twenty words will be coded per session. Towards the latter sessions, the coding rate may climb as high as forty words per sessions. The highest frequency occurring words are coded first progressing to the lower frequency occurring words.

Figure 4A:
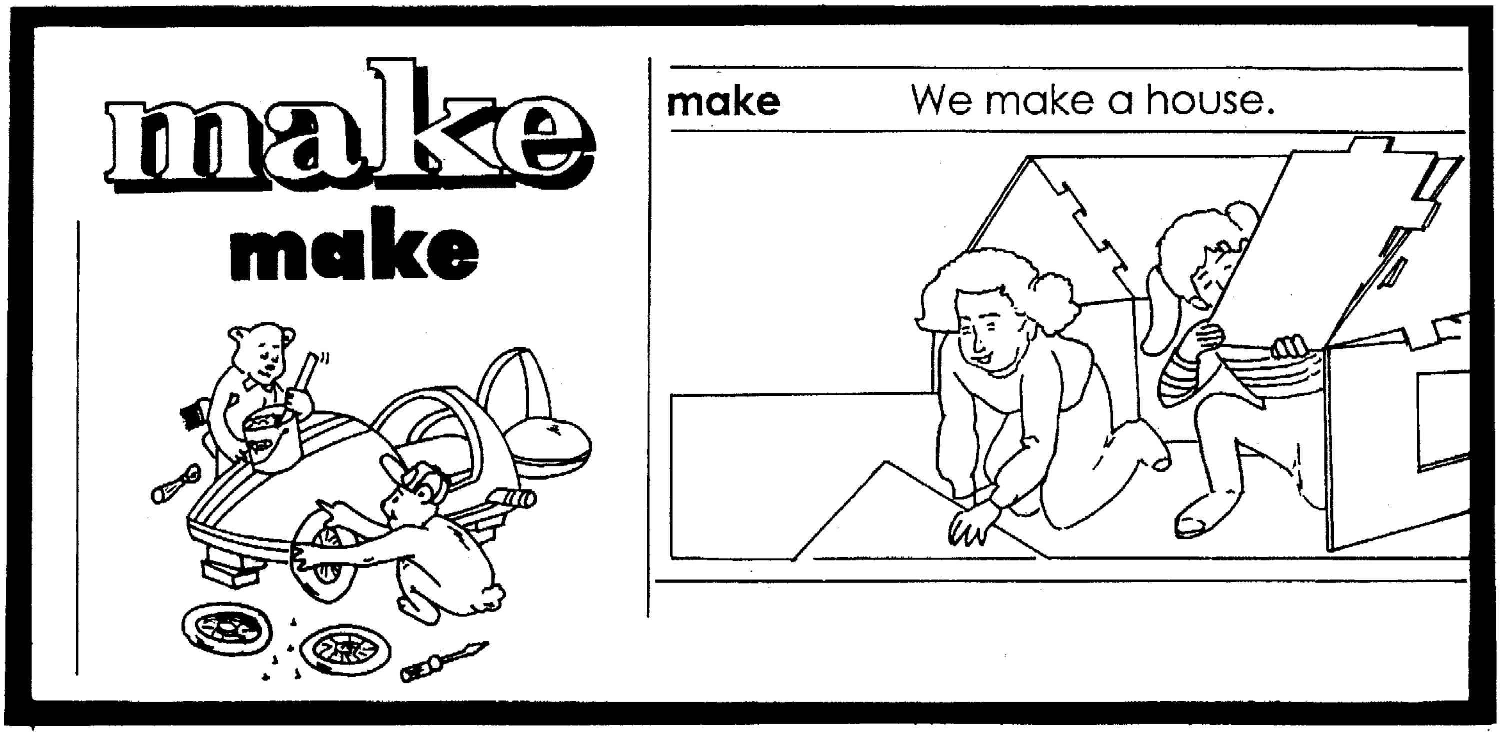
FIGS. 4A, 4B and 4C each illustrate a sample coding sheet for a word without a picture.
Figure 4B:
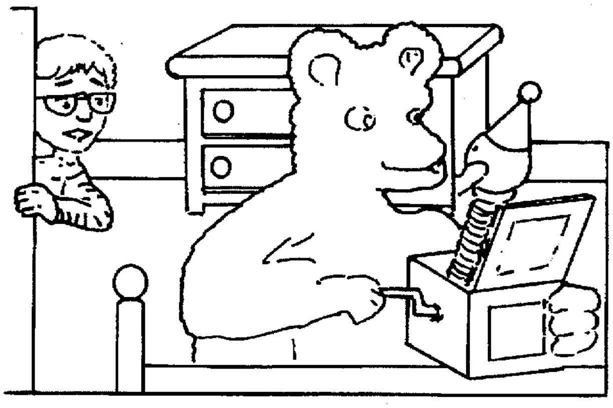
Figure 4C:
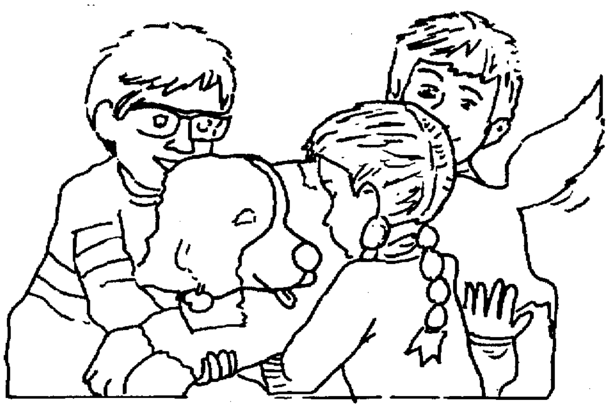
Figure 5A:
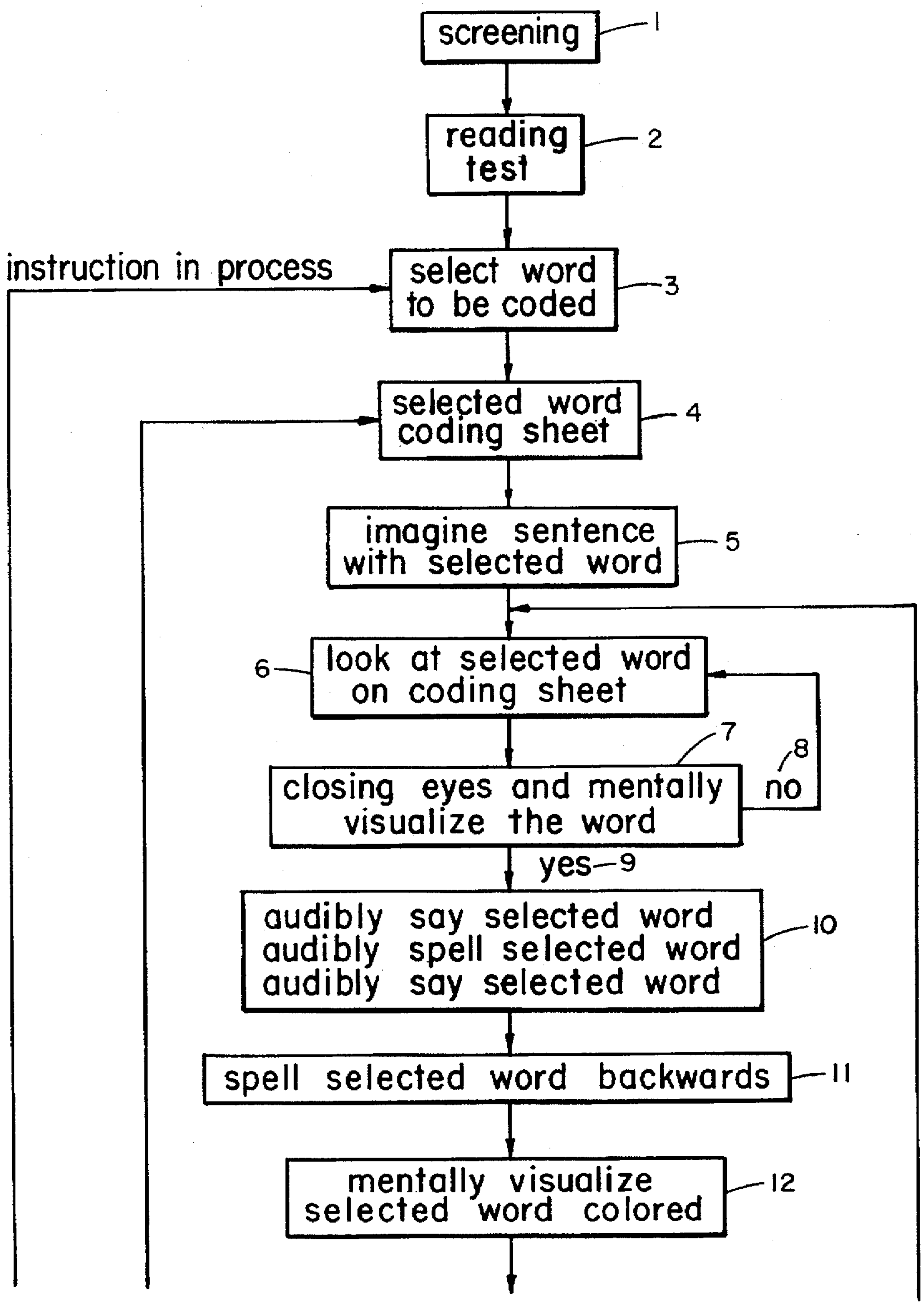
FIGS. 5A–5C contain a continuous flow chart illustrating the coding process using the invention method.
Figure 5B:
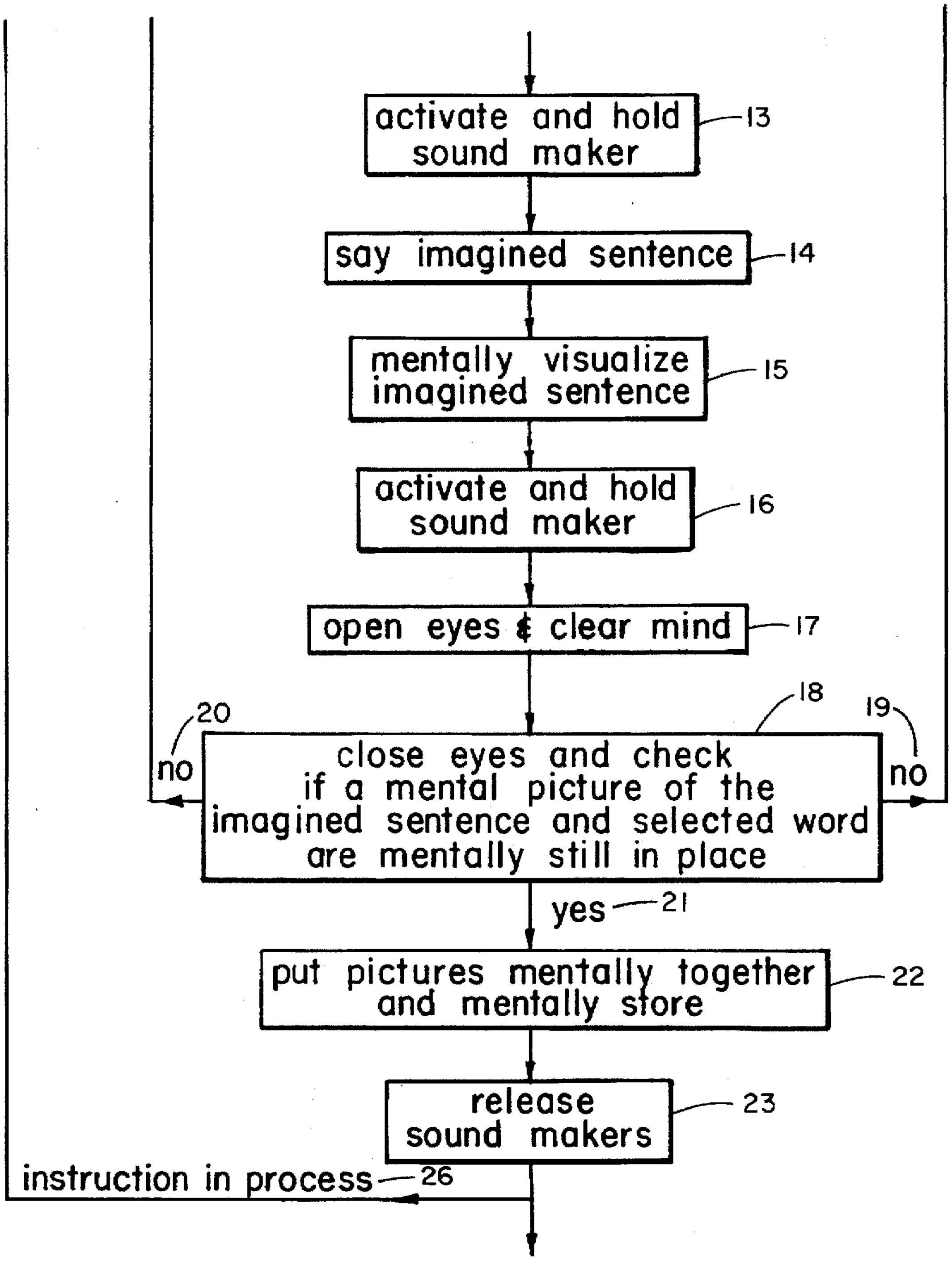
Figure 5C:
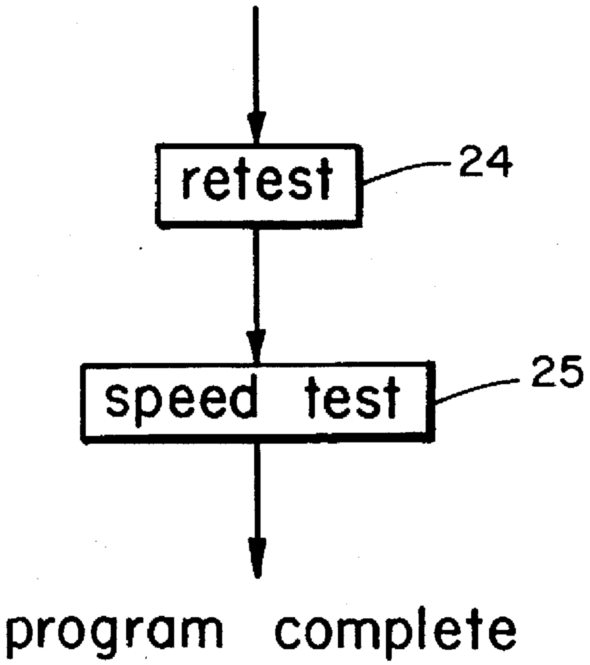

Each word selected is "coded" into a retrievable thought form. "Coding" means the student records the information about the word as a thought form and creates a trigger which will permit the student to retrieve it. The process of coding is as follows. A word to be coded is selected 3. A prepared coding sheet for a word is selected 4. FIGS. 4A, 4B and 4C illustrate sample coding sheets. The examples illustrated are for the words "make", "the" and "they". There is a coding sheet for each word listed in FIGS. 1A–1C. Each coding sheet has a word printed in large letters in a shadowed lower case and in a standard type face. The shadowing is to create the illusion of the word hanging in space, thereby making the word easier to visualize. The sheet contains a definition of the word, several sample sentences with the word in it, and a picture scene enacting one of the sentences or suggesting an application of the word.

After the screening and testing, the student is given two sound activators, i.e., "clickers", one for each hand, by a teacher. A clicker may be any one of a number of different type hand held sound makers. If this is the first word or session for the student, the teacher will or may prompt each action within the following steps. At all times, the teacher will provide assistance as needed. Although preferred, the use of a sound maker is not absolutely required for the invention process. It has been found that even a "snap" of the fingers may be sufficient.

The student is given a coding sheet for a selected word 4. The student then imagines a sentence 5 that best represents the idea of the word for him or her. There are examples and illustrations on the coding sheet to stimulate the student's thinking about the word and assist him or her in creating a sentence with the word in it.

The student next looks at the word on the sheet 6 and then close his or her eyes 7, as many times as necessary, to see the word clearly in the mind's "eye". The student then audibly says the word, spells the word, and then says the word again 10. The student then spells the word backwards 11. The student then mentally visualizes the word colored 12 a beautiful, warm, friendly color. The student then clicks 13 the clicker in his or her left hand and holds it down, thereby holding the word picture stable.

In the next step, the student says the imagined sentence 14 to himself or herself. The student then mentally visualizes the imagined sentence 15. The student then clicks 16 the clicker in his or her right hand, holding it down and holding the picture stable.

In the next step, the student then opens his or her eyes and clears his or her mind 17.

The student then closes his or her eyes and checks to see if the two pictures, i.e., the word and the sentence, are still in place 18, If either or both pictures are missing 19, 20, then the appropriate steps above are repeated. If the two pictures are in place 21, the student then puts the two pictures together and mentally stores them 22 by mentally placing them up and to the left. The student then releases both clickers 23. The word without a picture now has a picture and can be read by the reading impaired student.

The entire process is repeated 26 for each and every selected word. After nine sessions, the student has coded the core group of words without pictures as well as any additional special words and/or numbers and punctuations as are appropriate. During the tenth session, the same standard reading test 24 is given the student as was given during the first screening session. This way a direct comparison to measure improvement may be made. A "speed" test 25 is also given. The speed test is new material which the student is encouraged to read as fast as possible without regard to comprehension. Since the participants have been generally taught to read slowly to overcome their reading impairment prior to entering into the program of the present invention, this test demonstrates to the student that he or she can generally now read at normal reading rates with normal comprehension.

The method of the present invention has been found to be particularly effective among those suffering from dyslexia. The following cases are especially illuminating.

Case 1: Subject was a 67 year old female. In March, 1996 the subject was given the standard reading test in a first session. Her average comprehension was 92% with a reading rate of 110 words per minute. After ten sessions over a two and one-half month period, the subject was tested again with the same standard reading test and had an average comprehension of 100% with a reading rate of 222 words per minute. Subject was also given the "speed" reading test and had an average comprehension of 91% with a reading rate of 285 words per minute.

Case 2: Subject was a 52 year old male. In February, 1996 the subject was given the standard reading test in a first session. His average comprehension was 78% with a reading rate of 117 words per minute. After ten sessions over a two and one-half month period, the subject was tested again with the same standard reading test and had an average comprehension of 98% with a reading rate of 152 words per minute. Subject was also given the "speed" reading test and had an average comprehension of 93% with a reading rate of 273 words per minute.

Case 3: Subject was a 19 year old female. In May, 1996 the subject was given the standard reading test in a first session. Her average comprehension was 95% with a reading rate of 114 words per minute. After ten sessions over a two and one-half month period, the subject was tested again with the same standard reading test and had an average comprehension of 95% with a reading rate of 159 words per minute. Subject was also given the "speed" reading test and had an average comprehension of 95% with a reading rate of 218 words per minute.

It is understood that the above-described embodiments are merely illustrative of the application. Other embodiments may be readily devised by those skilled in the art which will embody the principles of the invention and fall within the spirit and scope thereof.

I claim:

1. A method of reading instruction whereby words without pictures, as well as other words which a particular reading impaired person finds especially difficult to read and understand, are coded into thought forms through the use of sensing anchors and triggers thereby resulting in the establishment of a mental picture for each such word, comprising the steps of:

screening a student to determine if the student is reading impaired;

providing a standard reading test to establish a reading skills benchmark;

providing a coding sheet for a selected word wherein said sheet has the selected word printed in large letters in a shadowed lower case and in a standard type face;

providing on the coding sheet a definition of the selected word, a plurality of sample sentences with containing the selected word, and a picture scene enacting one of the sentences or suggesting an application of the word;

instructing the student to create a thought form for the selected word according to the following steps:

imagining a sentence that best represents the idea of the selected word;

looking at the selected word on the sheet and then closing his or her eyes, repeating this step as many times as necessary, to mentally see the word clearly;

audibly saying the selected word, spelling the word, and then saying the word again;

spelling the selected word backwards;

mentally visualizing the selected word colored;

saying the imagined sentence to himself or herself;

mentally visualizing the imagined sentence;

opening his or her eyes and clearing his or her mind;

closing his or her eyes and checking whether a picture of the selected word and imagined sentence are mentally still in place;

if either or both pictures of the selected word and imagined sentence are not in place, then the sentence and/or word steps above are repeated;

if the two pictures are in place, the pictures are mentally put together and mentally stored.

2. The method of claim 1 further comprising the step of:

providing a second standard reading test.

3. The method of claim 2, further comprising the step of:

providing two hand held discrete-sound makers to the student after the screening and testing steps, one to be held in each hand.

4. The method of claim 3, further comprising:

activating the sound maker in the left hand after mentally visualizing the selected word colored.

5. The method of claim 4, further comprising:

activating the sound maker in the right hand after mentally visualizing the imagined sentence.

6. The method of claim 5, further comprising:

deactivating the sound makers in both hands after the pictures are mentally put together and mentally stored.

* * * * *